: 3,725,124
POLYMERIC FILM COATED WITH VINYL ACETATE/ETHYLENE COPOLYMER ADHESIVE
Bert S. Gorton, Kennett Square, Pa., assignor to E. I. du Pont de Nemours and Company, Wilmington, Del.
No Drawing. Filed Oct. 1, 1968, Ser. No. 764,333
Int. Cl. B32b 21/08, 27/30
U.S. Cl. 117—138.8 UA           7 Claims

ABSTRACT OF THE DISCLOSURE

A polymeric film, e.g., polyvinyl chloride, is disclosed which has, as a heat sealable coating on a surface thereof, a vinylacetatae/ethylene copolymer containing either iminated carboxylic acid groups or N-methylol amide groups. The film is particularly useful in a decorative film/board laminate prepared by a vacuum forming technique.

BACKGROUND OF THE INVENTION

As described in a November, 1966, article in "Modern Plastics," titled, "Woodgraining Brings New Dimension to Plastics Design," the lamination of decorative wood-grained polymeric films to a variety of surfaces is finding increasing use. As therein described, aesthetically pleasing structures can be prepared by laminating films to boards such as plywood, hardboard, and flakeboard. However, where the laminates are prepared by vacuum forming techniques, several difficulties have been encountered.

The application of a decorative film to a substrate such as board is accomplished by bringing the film, containing a heat sealable adhesive, in contact with the surface (generally contoured) to be coated and, thereafter, heating the film under vacuum so as to accomplish a snug fit. In order to make a completely satisfactory laminate, the heat sealable adhesive for the film must satisfy several stringent requirements. First of all, the adhesive must possess good hot tack strength. Since, in the preparation of the present laminated structures, the vacuum is ordinarily released before the structure is completely cool, the film will pull away from the board in the contoured portions on vacuum release if the hot tack strength is not sufficient. Secondly, the adhesive must be durable with high adhesive strength in order to prevent the film from separating from the board during actual use. This property is particularly important when the laminate is to be subjected to elevated temperatures where the film tends to shrink. If the adhesive is lacking in sufficient adhesive strength, the film will easily pull away from the board at such temperatures. Heretofore, there has not been provided an adhesive composition which is completely satisfactory in laminating vinyl films to board.

SUMMARY OF THE INVENTION

According to the present invention there is provided a heat sealable film which can be satisfactorily laminated to board. Thus, there is provided a structure comprising a polymeric film having as a heat sealable coating on a surface thereof an adhesive composition comprising a vinyl acetate/ethylene copolymer containing a minor amount of functional units selected from iminated carboxylic acid groups or N-methylol amide groups, said copolymer containing 5–35 weight percent ethylene.

DESCRIPTION OF THE PREFERRED EMBODIMENTS

Adhesive compositions useful in the present invention comprise vinyl acetate/ethylene copolymers containing minor amounts of functional units selected from iminated carboxylic acid groups and N-methylol amine groups. The ethylene content of useful copolymers is about 5–35 weight percent and, preferably, 10–20 weight percent. If less than about 5 percent ethylene is used, the copolymers are deficient in heat seal and hot tack strength. At ethylene contents higher than about 35 percent, sufficient adhesive strength is not present to provide a durable bond.

To an extent, the selection of the most appropriate ethyl/ene content is influenced by the molecular weight of the copolymer. With low molecular weight copolymers low ethylene contents, i.e., 5–15 weight percent, are most useful. On the other hand, with high molecular weight polymers, desirable heat seal and hot tack properties are obtained with copolymers having ethylene contents of 15–35. Polymers useful in the present invention have molecular weights corresponding to inherent viscosities of about 0.5–2 dl./g. and, preferably, 0.8–1.5 dl./g. Inherent viscosity is measured on a 0.5% solution of the polymer in acetone or, where separation of the polymer from the aqueous emulsion in which it is prepared would result in subsequent polymer insolubility, a 0.5% solution of the polymer in a 99:1 acetone-water mixture.

The functional units included in the present copolymers are either N-methylol amide groups, e.g., N-methylol acrylamide, or carboxylic acid groups, e.g., acrylic or methacrylic acid. While both of these groups can be introduced into the copolymer directly by copolymerization, such is usually only done with respect to the N-methylol amide groups; the iminated acid groups generally being introduced by initial polymerization of acrylic or methacrylic acid followed by imination with an aziridine compound such as ethylenimine. U.S. Pat. 3,345,318 issued to Lindemann et al. describes the preparation of vinyl acetate/ethylene/N-methylol acrylamide terpolymers which can be used in the present invention. These terpolymers are prepared by charging the vinyl acetate to the reaction vessel, pressurizing with ethylene, and thereafter incrementally adding N-methylol acrylamide during the course of the polymerization. In place of N-methylol acrylamide, useful terpolymers containing other N-methylol amides such as N-methylol methacrylamide can also be prepared in a similar fashion. In general, copolymers containing about 2.5–6 weight percent N-methylol amide, preferably 3–5 percent N-methylol acrylamide, are most useful in the present invention.

Useful copolymers containing iminated groups can be prepared by methods such as described in U.S. Pat. 3,261,-797 to McDowell et al. To prepare such polymers, vinyl acetate and ethylene are copolymerized in an aqueous medium with a carboxylic acid, such as acrylic or methacrylic acid, and the resulting terpolymer dispersion is iminated with an alkylenimine such as ethylenimine or propylenimine. When iminated copolymers are used, about 20–100 percent of the carboxylic acid groups are iminated; about 0.5–2 weight percent of carboxylic acid groups being present initially.

As indicated previously, the copolymers useful herein have intrinsic viscosities of about 0.5–2 dl./g. While such copolymers are useful alone, it may be desirable particularly when using iminated copolymers having low intrinsic viscosities, to include in the composition a polymeric component of higher molecular weight. In particular, it has been found desirable to include in such compositions noniminated vinyl acetate/ethylene copolymers similar in composition to those described above, i.e., 5–35 weight percent ethylene. When used, such copolymers have intrinsic viscosities of greater than about 2 and are present in an amount of about 1.5–4 parts per part of low molecular weight iminated copolymer. The use of high molecular weight copolymer in combination with the iminated copolymer results in a tough composition still possesses good heat seal and hot tack properties.

In addition to the above-described copolymers, the adhesive compositions uesful herein can contain other ingredients such as emulsion thickeners, preferably fugitive, and/or plasticizers so long as they do not substantially detract from the heat sealability or other properties of the compositions. Also, particularly with respect to compositions containing the N-methylol amide copolymers, it may be desirable to include curing stabilizers or catalysts. Thus, amine stabilizers such as dimethylaminoethanol are useful in order to prevent premature copolymer curing while catalysts such as ammonium toluenesulfonate can be used to enhance the rate of cure on heating.

While the above discussion relating to the preparation of the copolymers in the present composition has centered on emulsion polymerization, other polymerization techniques such as bulk or solution polymerization can also be used. However, irrespective of the method of preparation, care must be taken that ingredients which detract from the copolymer's heat sealability or other desirable properties are either excluded or compensated for. For example, a desirable method of preparing high molecular weight vinyl acetate/ethylene copolymers useful as additives to low molecular weight iminated copolymers is by an emulsion technique using polyvinyl alcohol as a protective colloid. However, it has been observed that the presence of this colloid in the dried film deleteriously effects the heat sealability of the composition. Accordingly, to be useful herein, such compositions should include polyvinyl alcohol tackifying agents such as ethylene glycol or polyethylene glycolaryl ether.

Presently, polyvinyl chloride is the most widely used decorative polymeric film and thus preferred for use in the present invention. However, other films such as those of polyvinylidene chloride, polyethylene, polystyrene, polypropylene, cellulose esters, acrylonitrile-butadiene-styrene copolymers, as well as vinyl chloride/vinyl acetate copolymers are also useful. While the thickness of the film is not particularly critical, thicknesses of about 3–50 mils are ordinarily employed.

In preparing the present heat sealable films, the vinyl acetate/ethylene copolymer adhesive compositions are generally applied to the films as aqueous dispersions which, after evaporation of the water, form continuous coatings on the film surface. Of course, other methods of adhesive application can be used. To be useful in the preparation of decorative wood structures, the copolymer should be present on the film in an amount of about 0.8–2.5 mils of dry adhesive. Lesser amounts of adhesive result in laminations with inferior peel strengths while excessive amounts of adhesive, though yielding higher peel strength, have cost disadvantages and exhibit excess creep.

The following examples illustrate the invention. All parts and percentages are by weight unless otherwise indicated.

EXAMPLE I

A 5-mil film of Reneer 8002 polyvinyl chloride film was coated with a 4-mil wet film of an aqueous emulsion containing a vinyl acetate/ethylene/N-methylol acrylamide terpolymer with 83 parts vinyl acetate, 13 parts ethylene and 4 parts of N-methylol acrylamide and an inherent viscosity of 1.3 dl./g. The wet film was heat dried at 140° F.

The dried film was tested by laminating it to a sheet of flakeboard on the surface of which a ½" wide half round dowel had been nailed in the form of an L to simulate a carved surface. Lamination was performed by placing the flakeboard on top of a vacuum forming plate and laying the film on top with the adhesive layer in contact with the board. The film was clamped to the vacuum plate at the edges to insure a vacuum tight seal. The upper surface of film was then heated with a heat gun until the surface temperature was about 140° F. The vacuum was then turned on and the hot, flexible polyvinyl chloride sucked down onto the flakeboard. The vacuum was left on for one minute while the film cooled slightly and then released.

Immediately after release the laminate was examined for delamination in the corners of the L. After fifteen minutes, no loss of bond could be seen. A one inch wide strip was next cut into the film and the film pulled from the board at a rate of 20"/min., requiring a force of 6 lbs./in. in a 180° angle peel. A large amount of fiber was pulled from the board during the peel indicating a very strong bond. Finally, an X-shaped cut was made through the bonded surface of the film to the board and the laminate then heat aged for two weeks in a 160° F. air oven. At the end of that period, no detectable shrinkage had occurred about the edges of the X.

EXAMPLES II–III

In accordance with the procedure set forth in Example I, polyvinyl chloride films are coated with heat sealable adhesive compositions containing the following ingredients:

| | | Example II, parts | Example III, parts |
|---|---|---|---|
| 1 | 55% solids emulsion of an iminated vinyl acetate/ethylene copolymer containing prior to imination 86.3% Vac, 12% E, 1.7% acrylic acid. About 30% iminated. Inherent visc., 0.6 dl./g. | 60 | 70 |
| 2 | 55% solids emulsion of a vinyl acetate/ethylene copolymer containing 87% Vac, 13% E, the emulsion containing 5% of polyvinyl alcohol, based on polymer with an inherent viscosity of greater than 2 | 60 | 70 |
| 3 | Polyethylene glycolaryl ether ("Pycal" 94) | 180 | 130 |
| 4 | Ethylene glycol | 40 | 5 |
| 5 | "Triton" X-100 surfactant | 40 | 5 |
| 6 | Water | 1 | 0.2 |
| | | 5 | 1 |

The compositions are formulated by dissolving ingredient 5 in 6 and adding the resulting solution to ingredient 1. Thereafter, ingredient 4 is added to 3 which in turn is mixed into 2 and the resultant mixture blended with 1 as above modified Films containing the Example II compositions show excellent heat seal and hot tack strengths while films coated with the Example III composition exhibit high adhesive durability and strength in combination with board.

What is claimed is:

1. A structure comprising a polymeric film having as a heat sealable coating on a surface thereof an adhesive composition consisting essentially of a vinyl acetate/ethylene copolymer containing a minor amount of functional units selected from iminated carboxylic acid groups or N-methylol amide groups, said copolymer containing 5–35 weight percent ethylene and having an inherent viscosity of 0.5–2 dl./g.

2. The structure of claim 1 wherein the copolymer contains, as functional units, 2.5–6 weight percent N-methylol acrylamide.

3. The structure of claim 2 wherein N-methylol acrylamide is present in an amount of 3–5 weight percent, ethylene is present in an amount of 10–20 weight percent, and the copolymer has an inherent viscosity of 0.8–1.5 dl./g.

4. The structure of claim 3 wherein the polymeric film is polyvinyl chloride.

5. The structure of claim 1 wherein the copolymer contains, as functional units, iminated carboxylic acid groups, said groups being present, prior to imination, in an amount of 0.5–2 weight percent with 20–100 percent of said groups being iminated.

6. The structure of claim 5 wherein the carboxylic acid groups are derived from methacrylic or acrylic acid and the copolymer contains 10–20 weight percent ethylene.

7. The structure of claim 6 wherein the adhesive composition contains, in addition to the iminated vinyl acetate/ethylene copolymer, 1.5–4 parts, per part of iminated copolymer, of a non-iminated vinyl acetate/ethylene copolymer containing 5–35 weight percent ethylene and having an inherent viscosity of at least 2.

References Cited

UNITED STATES PATENTS

| | | | |
|---|---|---|---|
| 3,261,797 | 7/1966 | McDowell et al. | 117—127 |
| 3,285,766 | 11/1966 | Barkis et al. | 117—161 UIC |
| 3,342,902 | 9/1967 | Peterkin | 117—122 H |
| 3,345,318 | 10/1967 | Lindemann et al. | 260—27 |
| 3,445,263 | 5/1969 | Alexander | 117—161 UIC |
| 3,483,023 | 12/1969 | Dotson et al. | 117—161 UIC |

RALPH HUSACK, Primary Examiner

U.S. Cl. X.R.

117—122 H, 138.8 A, 161 UT, UC, UN; 156—285, 331, 332; 161—247, 250; 260—80.73, 29.6 HN